United States Patent
Hoyos et al.

(10) Patent No.: US 8,990,884 B2
(45) Date of Patent: *Mar. 24, 2015

(54) QUANTIFYING RISK BASED ON RELATIONSHIPS AND APPLYING PROTECTIONS BASED ON BUSINESS RULES

(71) Applicant: International Business Machines Corporation, Armonk, NY (US)

(72) Inventors: Carlos A. Hoyos, Morrisville, NC (US); Charles S. Lingafelt, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/788,763

(22) Filed: Mar. 7, 2013

(65) Prior Publication Data

US 2014/0181900 A1    Jun. 26, 2014

Related U.S. Application Data

(63) Continuation of application No. 13/725,225, filed on Dec. 21, 2012.

(51) Int. Cl.
*G06F 21/31* (2013.01)
*G06F 21/60* (2013.01)
(Continued)

(52) U.S. Cl.
CPC ............ *G06F 21/604* (2013.01); *H04L 63/107* (2013.01); *H04L 63/102* (2013.01); *G06F 21/30* (2013.01); *G06F 21/31* (2013.01); *H04L 63/0272* (2013.01); *H04W 12/06* (2013.01); *G06F 2221/2111* (2013.01)
USPC .......... 726/1; 726/4; 726/17; 726/21; 726/22; 726/23; 726/28

(58) Field of Classification Search
CPC ..... H04L 63/102; H04L 63/107; G06F 21/30; G06F 21/31
See application file for complete search history.

(56) References Cited

U.S. PATENT DOCUMENTS 7,263,590 B1   8/2007   Todd et al.
7,552,481 B2   6/2009   Moona et al.
(Continued)

OTHER PUBLICATIONS

Mell, Peter; Grance, Tim; The NIST Definition of Cloud Computing; Version 15; Oct. 7, 2009.
(Continued)

*Primary Examiner* — Matthew Henning
(74) *Attorney, Agent, or Firm* — Cahn & Samuels, LLP

(57) ABSTRACT

An embodiment of the invention provides a method for controlling access to a system, wherein a request to access the system and metadata of the request are received from a user, the request including a user identification. The metadata includes: information obtained from a history of prior accesses to an application access system, information obtained from a history of prior accesses to a wireless authentication system, and/or confirmation of the user identification by an entity physically proximate to the user. A database is queried with the user identification and the metadata to identify relationship data. The relationship data indicates the relationship between the individual assigned the user identification and an entity owning the system, an entity leasing the system, and/or an entity operating the system. The relationship data is input into a rules engine; and, security measure(s) are selected with the rules engine based on the relationship data.

20 Claims, 8 Drawing Sheets

(51) Int. Cl.
  *H04L 29/06* (2006.01)
  *G06F 21/30* (2013.01)
  *H04W 12/06* (2009.01)

(56) References Cited

U.S. PATENT DOCUMENTS

| | | | |
|---|---|---|---|
| 7,660,795 B2 * | 2/2010 | Barrett et al. | 726/6 |
| 7,856,473 B2 | 12/2010 | Horikiri et al. | |
| 7,941,534 B2 | 5/2011 | De La Huerga | |
| 7,975,287 B2 | 7/2011 | Hung | |
| 8,230,194 B2 | 7/2012 | Matsunami et al. | |
| 8,255,517 B1 * | 8/2012 | Hernacki et al. | 709/224 |
| 8,281,034 B2 | 10/2012 | Roy | |
| 8,321,919 B2 | 11/2012 | Babeanu et al. | |
| 2002/0010679 A1 * | 1/2002 | Felsher | 705/51 |
| 2009/0276257 A1 | 11/2009 | Draper et al. | |
| 2010/0082377 A1 | 4/2010 | Hada et al. | |
| 2011/0040814 A1 | 2/2011 | Higgins | |
| 2012/0054827 A1 * | 3/2012 | Hom et al. | 726/2 |
| 2012/0151553 A1 * | 6/2012 | Burgess et al. | 726/1 |
| 2012/0167196 A1 | 6/2012 | Colar et al. | |
| 2012/0218075 A1 * | 8/2012 | Hill | 340/5.61 |

OTHER PUBLICATIONS

International Search Report for PCT/US13/76207 mailed May 28, 2014.

* cited by examiner

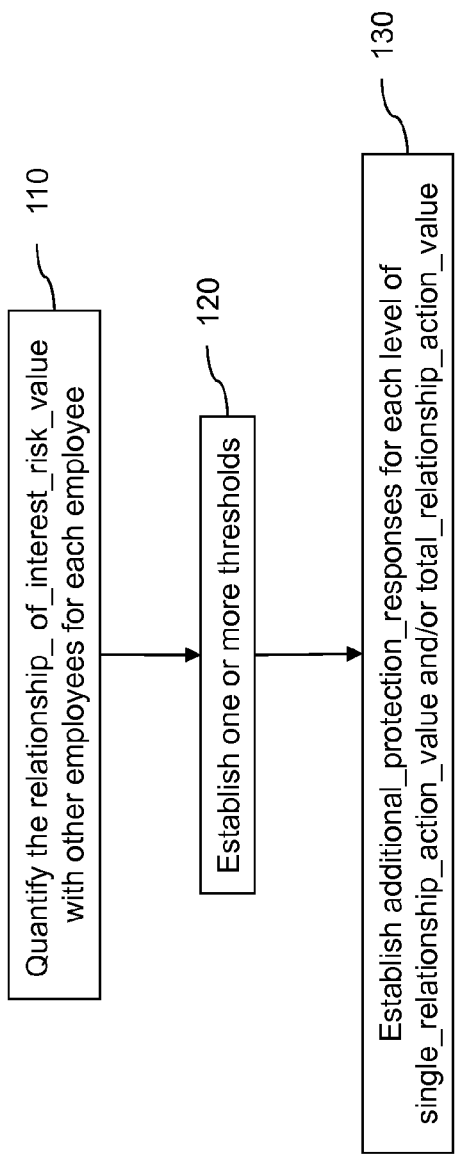

FIG. 3

| Relationship | Relationship Code | Value |
|---|---|---|
| employee to immediate manager | immediate_manager_relationship_of_interest_risk_value | 1 |
| employee to managers within management chain | management_chain_relationship_of_interest_risk_value | 2 |
| employee to all other managers | other_manager_relationship_of_interest_risk_value | 3 |
| employee to other employees in department | department_relationship_of_interest_risk_value | 4 |
| employee to not in department or management in same organization | no_org_relationship_of_interest_risk_value | 10 |

QUANTIFYING RISK BASED ON RELATIONSHIPS AND APPLYING PROTECTIONS BASED ON BUSINESS RULES

This patent application is a continuation application of U.S. patent application Ser. No. 13/725,225 filed on Dec. 21, 2012, which is hereby incorporated by reference.

BACKGROUND

The present invention is in the field of methods, systems, and computer program products for quantifying risk based on relationships and applying protections based on business rules.

A virtual private network (VPN) is an extension of a private intranet network across a public network, such as the Internet, creating a secure private connection. A VPN securely conveys information across the Internet connecting remote users, branch offices, and business partners into an extended corporate network. This effect can be achieved through a secure encryption tunnel, which allows a private network to send data via a public network's connections. The secure encryption tunnel encapsulates a network protocol within packets carried by the public network. The data sent between two locations via the secure encryption tunnel cannot be read by anyone else.

SUMMARY OF THE INVENTION

An embodiment of the invention provides a method for controlling access to a system, wherein a request to access the system is received from a user, and wherein the request includes a user identification. Metadata of the request to access the system is also received. The metadata includes: information obtained from a history of prior accesses to an application access system, information obtained from a history of prior access to a wireless authentication system, and/or confirmation of the user identification by an entity physically proximate to the user.

A database is queried with the user identification and the metadata to identify relationship data. The relationship data indicates the relationship between the individual assigned the user identification and an entity owning the system, an entity leasing the system, and/or an entity operating the system. The relationship data is input into a rules engine; and, one or more security measures are selected with the rules engine based on the relationship data.

Another embodiment of the invention provides an access control device for controlling access to a system, the access control device having an interface that receives a request to access the system from a user, the request including user identification. The interface also receives metadata of the request to access the system, the metadata including information obtained from a history of prior accesses to an application access system, information obtained from a history of prior accesses to a wireless authentication system, and/or confirmation of the user identification by an entity physically proximate the user.

A database is connected to the interface, wherein the database includes relationship data indicating the relationship between the individual assigned the user identification and an entity owning the system, an entity leasing the system, and/or an entity operating the system. A processor is connected to the database, wherein the processor queries the database with the user identification and the metadata to identify identified relationship data. A rules engine is connected to the processor, wherein the rules engine receives the identified relationship data from the processor and selects one or more security measures based on the identified relationship data.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 3 is a flow diagram illustrating a preparation phase according to an embodiment of the invention;

FIG. 4 is a table illustrating relationship of interest risk values according to an embodiment of the invention;

DETAILED DESCRIPTION

Example, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides an analytics method for determining whether additional security protections are needed for a party accessing a system, and for determining the specific additional security protections tuned to the accessing party. The method can be used in the context of an access control system for remotely accessing a system (e.g., VPN) with a user identification (e.g., user identification number and password), which may be shared between multiple individuals. The analytics method can be used between an enterprise's application and its employees or other systems with relationship data, such as a multi-company controlled access market place.

Figure 1:
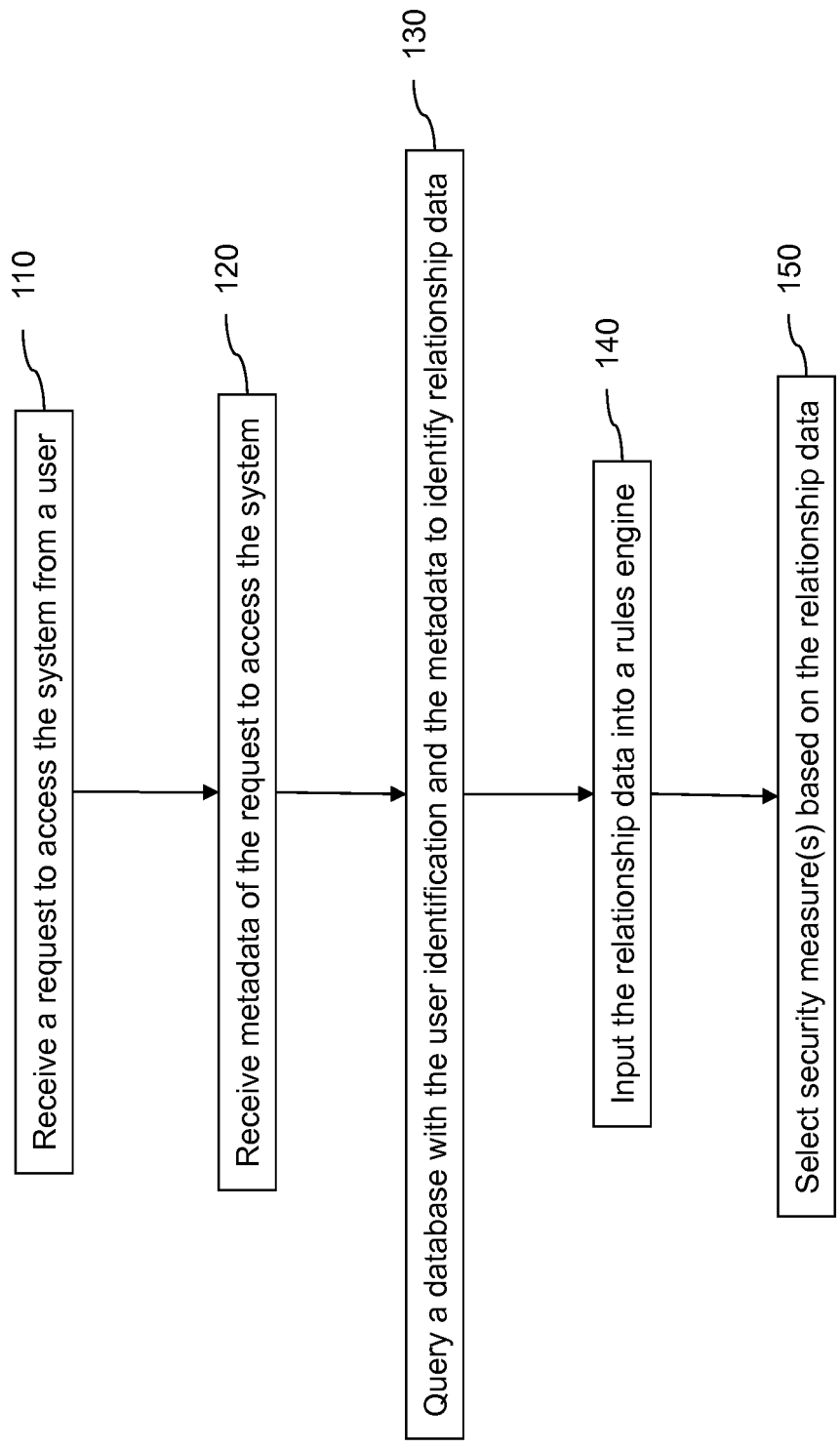
FIG. 1 is a flow diagram illustrating a method for controlling access to a system according to an embodiment of the invention.

FIG. 1 is a flow diagram illustrating a method for controlling access to a system (e.g., database/repository, server, network) according to an embodiment of the invention. A request to access the system is received from a user via an interface of the system 110, wherein the request includes a user identification. The user identification can include, for example, a user name (e.g., jdoe001), user identification number, employee number, social security number, group unit number, email address, and/or phone number.

Additionally, metadata of the request to access the system is received by the system's interface 120. In at least one embodiment, the metadata includes information obtained from a history of prior accesses (using the user identification) to an application access system and/or a wireless authentication system (also referred to herein as the "system"). In at least one embodiment, the application access system and/or wireless authentication system are separate from but connected to the system that the user is requesting access to, wherein the application access system and/or wireless authentication system are used by the user to access the "system".

The information obtained from the history of prior accesses to the application access system and/or wireless authentication system can include the physical and/or logical location(s) of prior accesses to the system. For example, the metadata can include the mailing address, room/office number, city and state, and/or GPS location of the prior accesses to the system. In another example, the metadata can include VPN tunnel endpoint, IP address, and/or MAC address of the prior accesses to the system. The metadata can be obtained or sent from a data repository (e.g., the employee relationship database), wherein the data repository can store information obtained from a history of prior accesses to the system.

Moreover, the information obtained from the history of prior accesses to the system can include the quantity and or frequency of prior accesses to the system. For example, the metadata may indicate that the user identification number has been used to access the system every business day for the past 3 months, twice a week for the past year, or over 150 times total.

In another embodiment, the metadata includes confirmation of the user identification by an entity physically proximate the user. For example, the metadata can include electronic verification from the user's supervisor that the user is authorized to use the user name. In another example, the metadata can include corroboration from another employee that the user is authorized to use the user identification number.

A database is queried (e.g., by a processor) with the user identification and the metadata to identify relationship data 130, wherein the relationship data can indicate the relationship between the individual assigned the user identification and the system. Specifically, the relationship data can indicate the relationship between the individual assigned the user identification and the entity owning the system, the entity leasing the system, and/or the entity operating the system. The relationship data can indicate that the individual assigned the user identification is a manager, an immediate manager, a manager in a management chain, a manager outside of the management chain, an employee, an employee in a select department (e.g., accounting, marketing, IT, research), an employee outside of the select department, an employee in the management chain, an employee outside of the management chain, an employee within a physical location, and/or an employee with select job title.

The relationship data is input into a rules engine 140; and, one or more security measures are selected with the rules engine based on the relationship data 150. The security measure can be a security question (e.g., where is Company XYZ's corporate headquarters? What is the name of your direct supervisor?), a security credential (e.g., digital certificate), and/or a secondary password.

The security measure can also send an alert (e.g., e-mail, text message, IM) to another entity (e.g., system administrator, security personnel, a supervisor or manager) and/or require authorization/approval from the other entity. In another embodiment, the security measure queries the device (e.g., computer, workstation, mobile device) at the requesting endpoint for a device attribute and/or a device identification, such as, for example, serial number, processor ID, network address, and/or device stored credential (e.g., certificate, PW, token, pass phrase).

Figure 2:
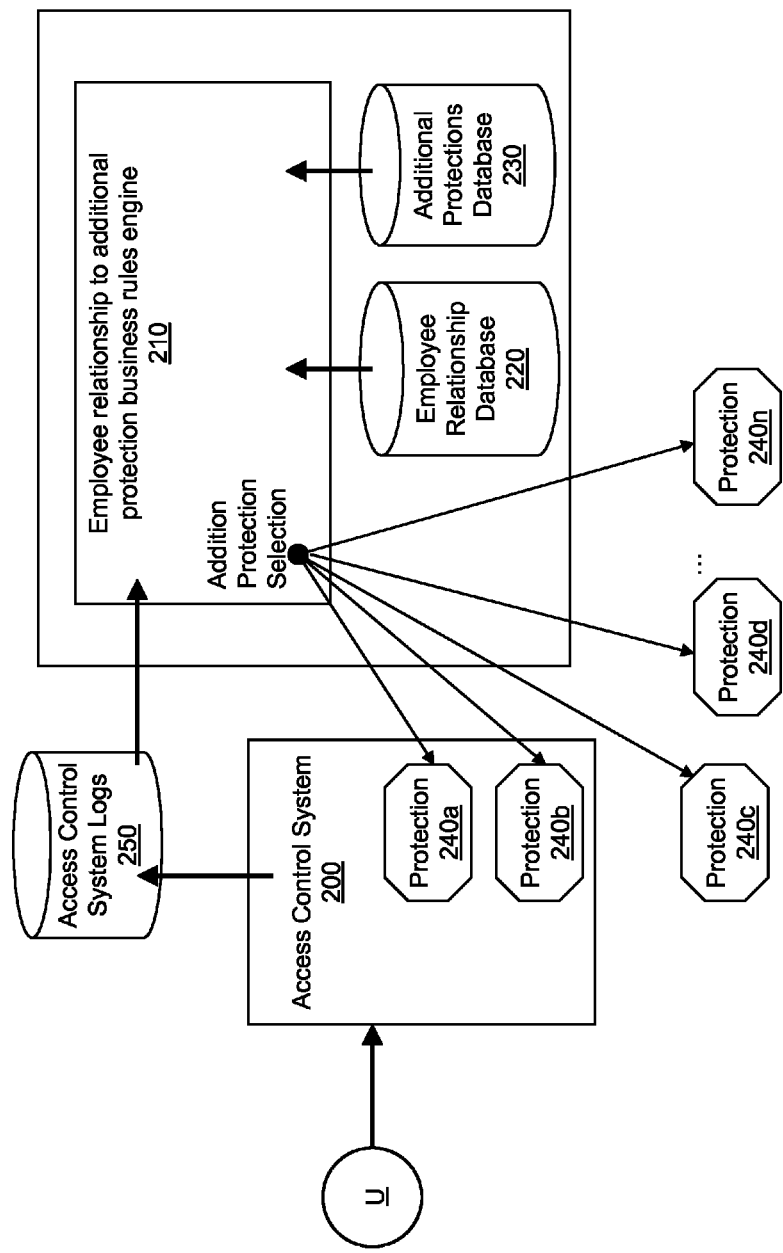
FIG. 2 illustrates an access control system according to an embodiment of the invention.

FIG. 2 illustrates an access control system 200 according to an embodiment of the invention. The access control system 200 sends a request for access from a user U to a business rule engine 210 (e.g., via access control system logs 250). Data from an employee relationship database 220 and an additional protection database 230 are sent to the business rule engine 210. In at least one embodiment, the business rule engine 210 queries the employee relationship database 220 and/or the additional protection database 230. The business rule engine 210 evaluates the data and applies business rules to select which, if any, additional protections 240a-n to apply. The protections (also referred to herein as "security measures") can be within the access control system 200 (i.e., 240a-b) or outside of the access control system (i.e., 240c-n). In at least one embodiment, historical relationships are stored and evaluated after they are formed in access control system log files 250. The access control system log files 250 can be in a standalone database and/or in a cloud computing environment. The business rules can be applied to the historical relationships to select which, if any additional protections 240a-n to apply.

Sharing of user identification numbers can be the method of operation in enterprise systems that have a significant focus on cost of informational technology, or in enterprise systems where the value of information is limited or not uniformly distributed in the enterprise environment. For those systems, there can arise a need to apply additional protection or safeguards in certain circumstances, but not in other circumstances. For example, the application of additional protections may be costly and the enterprise may desire to only apply them in specific situations, e.g., if the requested endpoint contains "high value" information, or the requested endpoint is subject to a regulation mandating additional protections.

The analytics method can be embodied into remote access systems (e.g., AT&T™ remote access VPN service (available from AT&T™, Dallas, Tex.)), general purpose access control systems (e.g., Tivoli™ Identity Manager (available from IBM™, Armonk, N.Y.)), or into other access control systems that are embedded within products. Although certain embodiments of the invention are described with respect to an employee requesting access to a remote access system of an enterprise, it is recognized that the methods and systems herein can be applied to other systems in which a user identifier can be used by multiple entities (e.g., devices or people) without a hard linkage to each entity.

An embodiment of the invention provides a system that determines the degree of risk of compromise based on an employee's work relationships across a shared account and applies additional protections based on the degree of risk. A preparation phase quantifies relationship data and the associated additional protections. An operational phase examines the relationship data and applies the additional protections that were identified in the preparation phase. This can be performed by a rules engine.

For example, if the system identifies a user identification number (also referred to herein as the "user identification") assigned to a manager within the management chain, then the system will present the user a challenge question. If the system identifies a user identification number that is assigned to a manager outside of the management chain, then the system can present the user a challenge question and send an alerting email. If the system identifies a user identification number that is assigned to an employee within the department, then the system can present the user a challenge question. If the system identifies a user identification number that is assigned to an employee not in the department or within the management chain, then the system can require confirmation from the owner of the user identification number and/or a system administrator within 1 hour FIG. 3 is a flow diagram illustrating a preparation phase according to an embodiment of the invention. For each employee, the relationship_of_interest_risk_value with other employees is quantified 310. FIG. 4 is a table illustrating example relationship_of_interest_risk_values for an employee to immediate manager relationship, an employee to managers within the management chain relationship, an employee to all other managers relationship, an employee to other employees in department relationship, and an employee to not in department or management in same organization relationship.

One or more thresholds are established 320. A single_relationship_action_value can be established, which defines a user to another user relationship value above which an action is taken. Moreover, a total_relationship_action_value can be established, which defines a user to all other users relationship value above which an action is taken.

For each level of single_relationship_action_value and/or total_relationship_action_value, additional_protection_responses are established 330. For example, if the single_relationship_action_value is greater than 3, then the additional_protection_responses=request additional credential (e.g., a pass phrase). In another example, if the single_relationship_action_value is greater than 5, then the additional_protection_responses=log access with security operations center. In yet another example, if the total_relationship_action_value is greater than 10, then the additional_protection_responses=encrypt device's disk drive; and, if the total_relationship_action_value is greater than 20, then the additional_protection_responses=do not allow company confidential-restricted data on the endpoint. The operational phase can examine the relationship data and apply the additional protections that were identified in the preparation phase.

Figure 5:
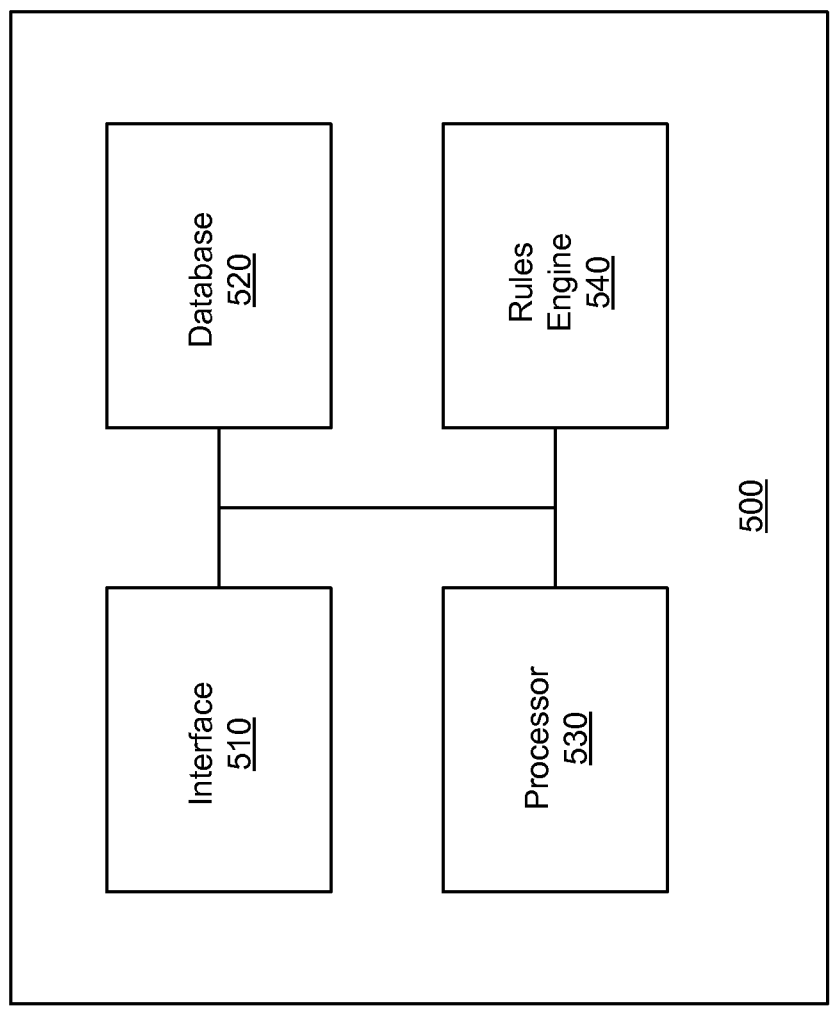
FIG. 5 illustrates a system for controlling access to another system according to an embodiment of the invention.

FIG. 5 illustrates an access control device 500 for controlling access to a system (e.g., database/repository, server, network) according to an embodiment of the invention. As used herein, the term "access control device" can include a system of multiple components connected to one another (e.g., an interface, database, processor, rules engine). The access control device 500 includes an interface 510 that receives a request to access the system from a user, the request including user identification. The user identification can include, for example, a user name (e.g., jdoe001), user identification number, employee number, social security number, group unit number, email address, and/or phone number.

The interface 510 also receives metadata of the request to access the system, wherein the metadata can include confirmation of the user identification by an entity physically proximate the user and/or information obtained from a history of prior accesses to an application access system (e.g., the access control device 500). As used herein, the term "proximate" can include near, adjacent, contiguous, next to, close to, by, on, in contact with, and the like. In at least one embodiment, the history of prior accesses to the application access system includes the quantity and/or frequency of prior accesses to the application access system, and/or the physical and/or logical location of prior accesses to the application access system.

The metadata can also include information obtained from a history of prior accesses to a wireless authentication system (e.g., the access control device 500). In at least one embodiment, the history of prior accesses to the wireless authentication system includes the quantity and/or frequency of prior accesses to the wireless authentication system, and/or the physical and/or logical location of prior accesses to the wireless authentication system. The metadata can be obtained from and stored in a data repository that is within or separate from the access control device.

A database 520 is connected to the interface 510, wherein the database 520 includes relationship data indicating the relationship between the individual assigned the user identification and the entity owning the system, the entity leasing the system, and/or the entity operating the system. As used herein, the term "connected" includes operationally connected, logically connected, in communication with, physically connected, engaged, coupled, contacts, linked, affixed, and attached. In at least one embodiment of the invention, the relationship data includes a manager, an immediate manager, a manager in a management chain, a manager outside of the management chain, an employee, an employee in a select department, an employee outside of the select department, an employee in the management chain, an employee outside of the management chain, an employee within a select business unit, an employee within a physical location, and/or an employee with a select job title. In at least one embodiment, the metadata is stored in the database 520.

The access control device 500 further includes a processor 530 connected to the database 520, wherein the processor 520 queries the database 520 with the user identification and the metadata to identify identified relationship data. The processor 530 is connected to a rules engine 540, wherein the rules engine 540 receives the identified relationship data from the processor 530. The rules engine 540 selects one or more security measures based on the identified relationship data. In at least one embodiment, the security measure includes requiring the user to answer at least one security question, requiring the user to provide at least one security credential, sending of at least one alert, requiring at least one authorization from another entity, querying a device at the requesting endpoint for at least one device attribute, and/or querying the device at the requesting endpoint for device identification.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
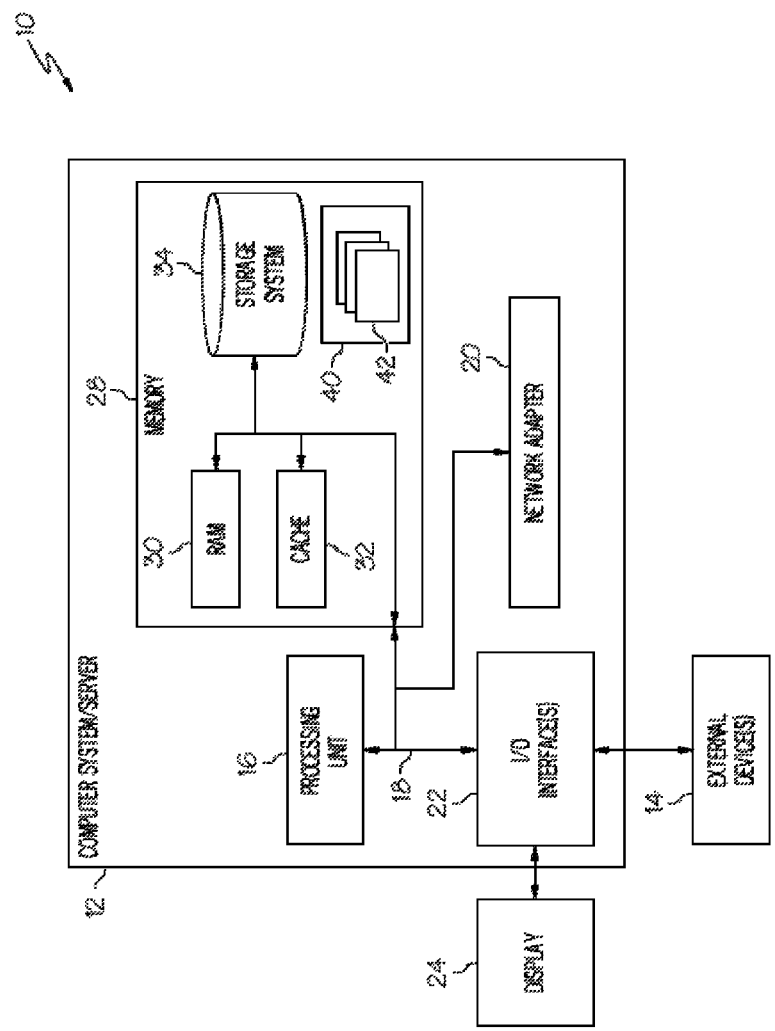
FIG. 6 depicts a cloud computing node according to an embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
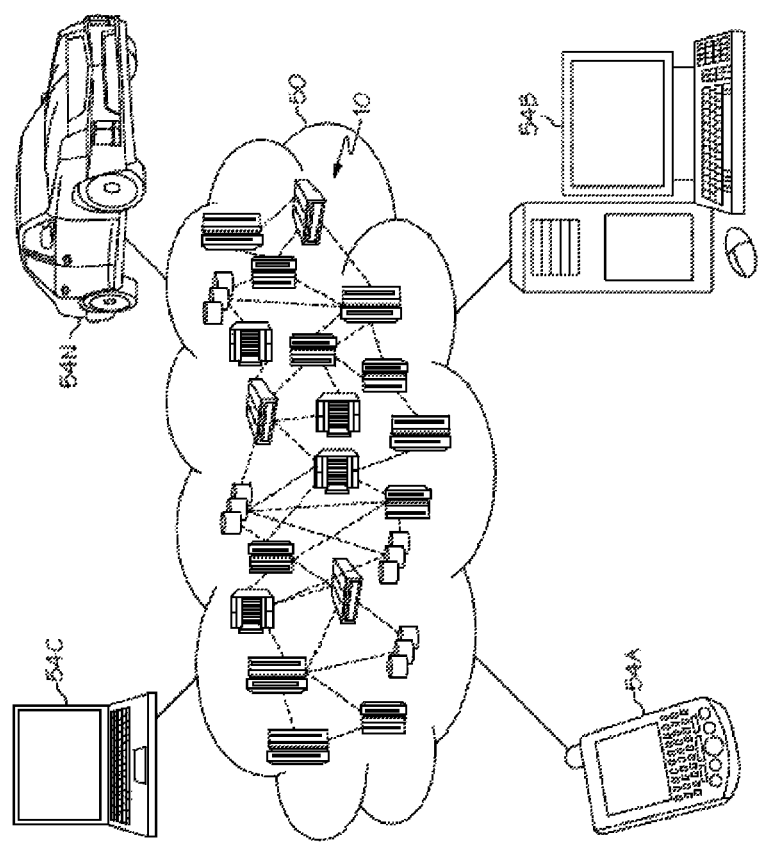
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
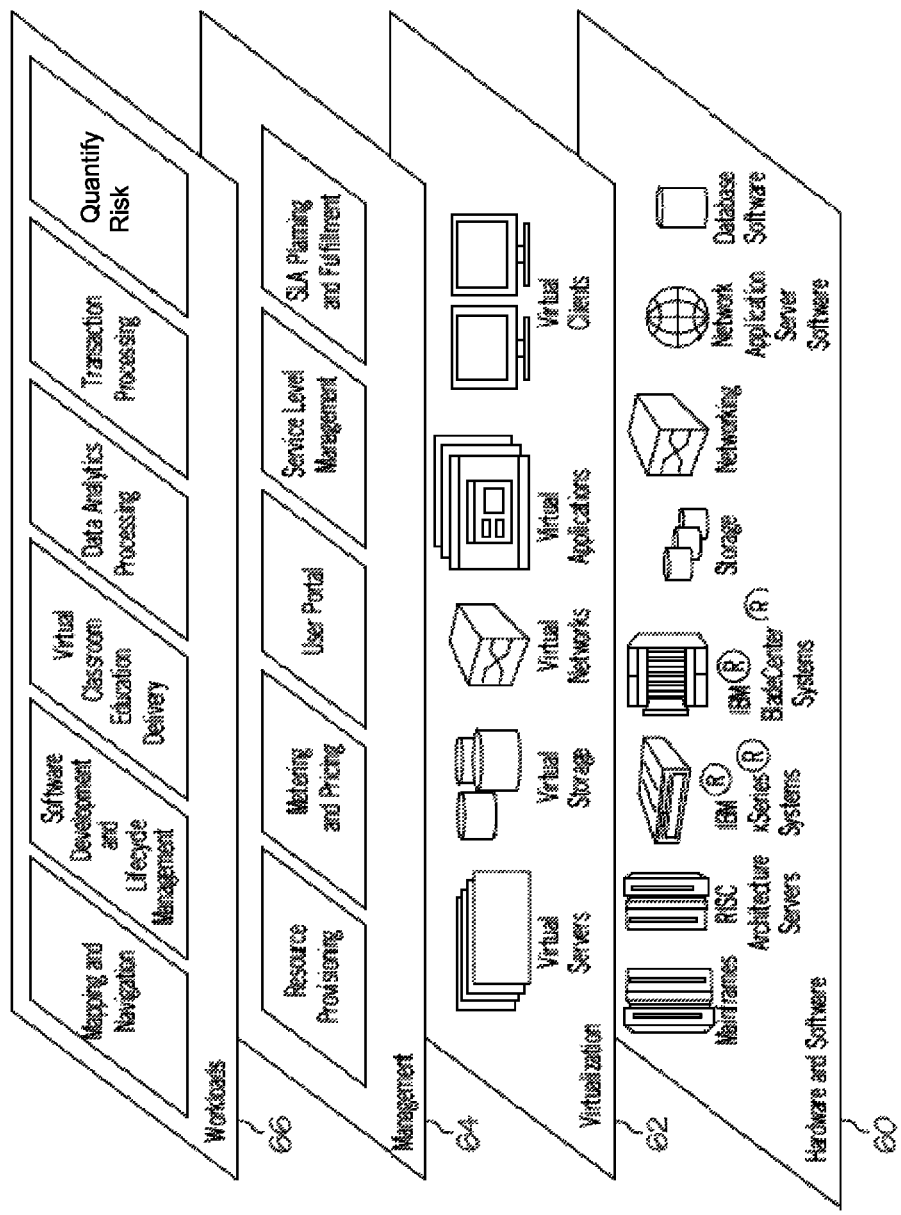
FIG. 8 depicts abstraction model layers according to an embodiment of the present invention.
Figure 9:
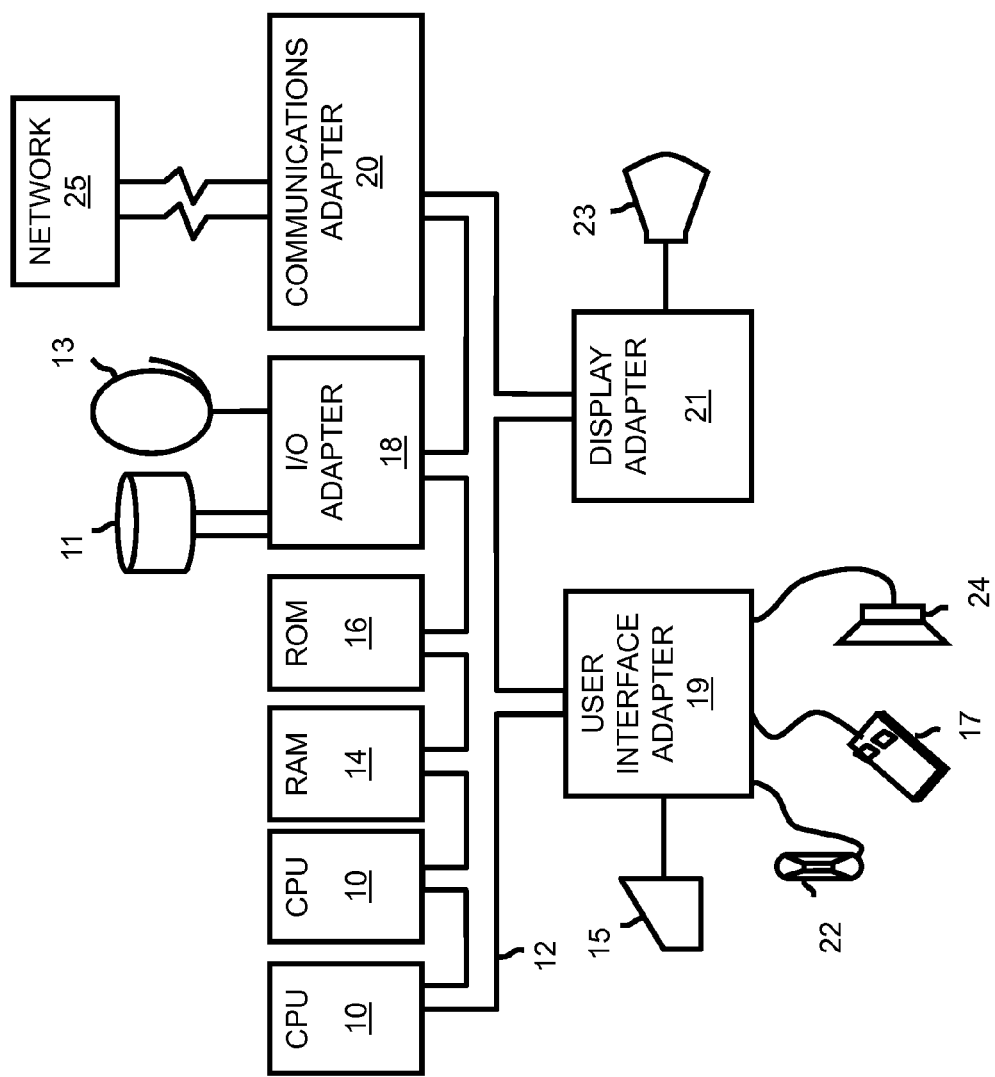
FIG. 9 illustrates a computer program product according to an embodiment of the invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, quantifying risk, and applying protections.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 6, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The embodiment was chosen and described in order to best explain the principles of the invention and the practical application, and to enable others of ordinary skill in the art to understand the invention for various embodiments with various modifications as are suited to the particular use contemplated.

What is claimed is:

1. An access control device comprising:
    an interface, said interface receives a request to access a virtual private network (VPN) from a user and metadata of the request to access the VPN, the request to access the VPN including a user identification, the metadata including:
        confirmation of the user identification by an entity physically proximate the user, the entity physically proximate to the user including a coworker of the user, and
        a VPN tunnel endpoint;
    a database connected to said interface, said database including relationship data indicating a relationship between an individual assigned the user identification and the VPN, the relationship data indicating a relationship between an individual assigned the user identification and the VPN, wherein the relationship data includes a degree of risk of compromise;
    a processor connected to said database, said processor queries said database with the user identification and the metadata to identify identified relationship data; and
    a rules engine connected to said processor, said rules engine receives the identified relationship data from said processor and selects at least one security measure based on the identified relationship data, said rules engine:
        selects a greater security measure the farther the relationship between the individual assigned the user identification and the VPN, and
        selects a lesser security measure the closer the relationship between the individual assigned the user identification and the VPN.

2. The access control device according to claim 1, wherein the metadata includes information obtained from a history of prior accesses to an application access system.

3. The access control device according to claim 2, wherein the history of prior accesses to the application access system includes at least one of:
    a quantity of prior accesses to the application access system;
    a frequency of prior accesses to the application access system;
    a physical location of prior accesses to the application access system;
    a logical location of prior accesses to the application access system; and
    at least one identifier of a device accessing the VPN.

4. The access control device according to claim 1, wherein the metadata includes information obtained from a history of prior accesses to a wireless authentication system.

5. The access control device according to claim 4, wherein the history of prior accesses to the wireless authentication system includes at least one of:
    a quantity of prior accesses to the wireless authentication system;
    a frequency of prior accesses to the wireless authentication system;
    a physical location of prior accesses to the wireless authentication system; and
    a logical location of prior accesses to the wireless authentication system.

6. The access control device according to claim 1, wherein the metadata includes confirmation of the user identification by an entity physically proximate the user.

7. The access control device according to claim 1, wherein the relationship data indicates a relationship between the individual assigned the user identification and at least one of an entity owning the VPN, an entity leasing the VPN, and an entity operating the VPN.

8. The access control device according to claim 1, wherein the relationship data includes at least one of a manager, an immediate manager, a manager in a management chain, a manager outside of the management chain, an employee, an employee in a select department, an employee outside of the select department, an employee in the management chain, an employee outside of the management chain, an employee within a select business unit, an employee within a physical location, an employee with select job title, an employee with a select job role, and an employee with a select job responsibility.

9. The access control device according to claim 1, wherein the security measure includes at least one of:
    requiring the user to answer at least one security question;
    requiring the user to provide at least one security credential;
    sending of at least one alert;
    requiring at least one authorization from another entity;
    querying a device at the requesting endpoint for at least one device attribute; and
    querying the device at the requesting endpoint for device identification.

10. An access control device for controlling access to a virtual private network (VPN), said access control device comprising:
    an interface, said interface receives a request to access the VPN from a user and metadata of the request to access the VPN, the request to access the VPN including a user identification, the metadata including:
        information obtained from a history of prior accesses to an application access system,
        information obtained from a history of prior accesses to a wireless authentication system,
        confirmation of the user identification by an entity physically proximate the user, the entity physically proximate to the user including a coworker of the user, and
        a VPN tunnel endpoint;
    a database connected to said interface, said database including relationship data indicating a relationship between an individual assigned the user identification and the VPN, the relationship data indicating a relationship between an individual assigned the user identification and the VPN, wherein the relationship data includes a degree of risk of compromise;
    a processor connected to said database, said processor queries said database with the user identification and the metadata to identify identified relationship data; and
    a rules engine connected to said processor, said rules engine receives the identified relationship data from said processor and selects at least one security measure based on the identified relationship data, said rules engine:
        selects a greater security measure the farther the relationship between the individual assigned the user identification and the VPN, and
        selects a lesser security measure the closer the relationship between the individual assigned the user identification and the VPN.

11. The access control device according to claim 10, wherein the history of prior accesses to the application access system includes at least one of:
   a quantity of prior accesses to the application access system;
   a frequency of prior accesses to the application access system;
   a physical location of prior accesses to the application access system; and
   a logical location of prior accesses to the application access system.

12. The access control device according to claim 10, wherein the history of prior accesses to the wireless authentication system includes at least one of:
   a quantity of prior accesses to the wireless authentication system;
   a frequency of prior accesses to the wireless authentication system;
   a physical location of prior accesses to the wireless authentication system; and
   a logical location of prior accesses to the wireless authentication system.

13. The access control device according to claim 10, wherein the relationship data includes at least one of a manager, an immediate manager, a manager in a management chain, a manager outside of the management chain, an employee, an employee in a select department, an employee outside of the select department, an employee in the management chain, an employee outside of the management chain, an employee within a select business unit, an employee within a physical location, and an employee with select job title.

14. The access control device according to claim 10, wherein the security measure includes at least one of:
   requiring the user to answer at least one security question;
   requiring the user to provide at least one security credential;
   sending of at least one alert;
   requiring at least one authorization from another entity;
   querying a device at the requesting endpoint for at least one device attribute; and
   querying the device at the requesting endpoint for device identification.

15. An access control device for controlling access to a virtual private network (VPN), said access control device comprising:
   an interface, said interface receives a request to access the VPN from a user and metadata of the request to access the VPN, the request to access the VPN including a user identification, the metadata including:
      information obtained from a history of prior accesses to an application access system,
      information obtained from a history of prior accesses to a wireless authentication system,
      confirmation of the user identification by an entity physically proximate the user, the entity physically proximate to the user including a coworker of the user, and
      a VPN tunnel endpoint;
   a database connected to said interface, said database including relationship data indicating a relationship between the individual assigned the user identification and at least one of an entity owning the VPN, an entity leasing the VPN, and an entity operating the VPN, wherein the relationship data includes a degree of risk of compromise;
   a processor connected to said database, said processor queries said database with the user identification and the metadata to identify identified relationship data; and
   a rules engine connected to said processor, said rules engine receives the identified relationship data from said processor and selects at least one security measure based on the identified relationship data, said rules engine:
      selects a greater security measure the farther the relationship between the individual assigned the user identification and the VPN, and
      selects a lesser security measure the closer the relationship between the individual assigned the user identification and the VPN.

16. The access control device according to claim 15, wherein the history of prior accesses to the application access system includes:
   a quantity of prior accesses to the application access system;
   a frequency of prior accesses to the application access system;
   a physical location of prior accesses to the application access system; and
   a logical location of prior accesses to the application access system.

17. The access control device according to claim 15, wherein the history of prior accesses to the wireless authentication system includes:
   a quantity of prior accesses to the wireless authentication system;
   a frequency of prior accesses to the wireless authentication system;
   a physical location of prior accesses to the wireless authentication system; and
   a logical location of prior accesses to the wireless authentication system.

18. The access control device according to claim 15, wherein the relationship data includes at least one of a manager, an immediate manager, a manager in a management chain, a manager outside of the management chain, an employee, an employee in a select department, an employee outside of the select department, an employee in the management chain, an employee outside of the management chain, an employee within a select business unit, an employee within a physical location, and an employee with select job title.

19. The access control device according to claim 15, wherein the security measure includes:
   requiring the user to answer at least one security question;
   requiring the user to provide at least one security credential;
   sending of at least one alert;
   requiring at least one authorization from another entity;
   querying a device at the requesting endpoint for at least one device attribute; and
   querying the device at the requesting endpoint for device identification.

20. A computer program product for controlling access to a virtual private network (VPN), said computer program product comprising:
   a non-transitory computer readable storage medium;
   first program instructions to receive a request to access the VPN from a user, the request including a user identification;
   second program instructions to receive metadata of the request to access the VPN, the metadata including:

confirmation of the user identification by an entity physically proximate the user, the entity physically proximate to the user including a coworker of the user, and a VPN tunnel endpoint;

third program instructions to query a database with the user identification and the metadata to identify relationship data, the relationship data indicating a relationship between an individual assigned the user identification and the VPN, wherein the relationship data includes a degree of risk of compromise;

fourth program instructions to input the relationship data into a rules engine; and fifth program instructions to select at least one security measure with the rules engine based on the relationship data, said fifth program instructions:

selects a greater security measure the farther the relationship between the individual assigned the user identification and the VPN, and selects a lesser security measure the closer the relationship between the individual assigned the user identification and the VPN, wherein said first program instructions, said second program instructions, said third program instructions, said fourth program instructions, and said fifth program instructions are stored on said computer readable storage medium.

* * * * *